United States Patent
Xie et al.

(10) Patent No.: US 8,560,824 B2
(45) Date of Patent: Oct. 15, 2013

(54) METHODS AND DEVICES FOR DECOMPRESSING AND EXECUTING OPTION MEMORY FOR DEVICE IN SHADOW MEMORY OF A COMPUTER SYSTEM HAVING A BIOS

(75) Inventors: Jinwen Xie, Sugar Hill, GA (US); Daniel G. Samuelrai, Lawrenceville, GA (US); Bibhu Das, Avondale Estates, GA (US); Anuj K. Jain, Duluth, GA (US); Audrius Stripeikis, Norcross, GA (US)

(73) Assignee: LSI Corporation, San Jose, CA (US)

( * ) Notice: Subject to any disclaimer, the term of this patent is extended or adjusted under 35 U.S.C. 154(b) by 994 days.

(21) Appl. No.: 12/200,237

(22) Filed: Aug. 28, 2008

(65) Prior Publication Data

US 2010/0057981 A1 Mar. 4, 2010

(51) Int. Cl.
*G06F 9/00* (2006.01)
*G06F 15/177* (2006.01)

(52) U.S. Cl.
USPC ............................................................ 713/2

(58) Field of Classification Search
USPC ....................................................... 713/320
See application file for complete search history.

(56) References Cited

U.S. PATENT DOCUMENTS

| | | | | |
|---|---|---|---|---|
| 5,671,413 A | * | 9/1997 | Shipman et al. | 713/2 |
| 5,836,013 A | * | 11/1998 | Greene et al. | 713/2 |
| 5,850,562 A | * | 12/1998 | Crump et al. | 713/1 |
| 6,421,776 B1 | * | 7/2002 | Hillis et al. | 713/2 |
| 6,718,401 B2 | * | 4/2004 | Nalawadi et al. | 710/13 |
| 6,757,838 B1 | * | 6/2004 | Chaiken et al. | 714/5.11 |
| 6,971,003 B1 | * | 11/2005 | Mahmoud | 713/2 |
| 2005/0216757 A1 | * | 9/2005 | Gardner | 713/194 |
| 2006/0277271 A1 | * | 12/2006 | Morse et al. | 709/217 |
| 2007/0043938 A1 | * | 2/2007 | May et al. | 713/2 |
| 2007/0168513 A1 | * | 7/2007 | Weiskopf et al. | 709/225 |
| 2007/0204153 A1 | * | 8/2007 | Tome et al. | 713/164 |
| 2007/0204166 A1 | * | 8/2007 | Tome et al. | 713/182 |
| 2008/0012839 A1 | * | 1/2008 | Feague et al. | 345/179 |
| 2008/0270309 A1 | * | 10/2008 | Brotman et al. | 705/52 |
| 2008/0276326 A1 | * | 11/2008 | Bhansali et al. | 726/36 |
| 2009/0235237 A1 | * | 9/2009 | Song et al. | 717/132 |

OTHER PUBLICATIONS

UEFI downloaded on Feb. 10, 2012 http:www.uefi.org/about.
Mobile OS Symbian port to Intel's Atom chip downloaded on Feb. 10, 2012 http://www.artechnica.com/gadgets/news/2009/04/symbian-ported-to-intels-atom-chips.ars.
ARM architecture downloaded on Feb. 10, 2012 http://en.wikipedia.org/wiki/ARM.

* cited by examiner

*Primary Examiner* — Mohammed Rehman
(74) *Attorney, Agent, or Firm* — Duft Bornsen & Fettig LLP (57) ABSTRACT

Methods and systems for executing a decompressed portion of an option memory in a shadow memory. An area of system memory is allocated and a portion of the option memory is decompressed using the allocated area. The decompressed portion is stored in the shadow memory so the decompressed portion can be executed in shadow memory.

20 Claims, 9 Drawing Sheets

METHODS AND DEVICES FOR DECOMPRESSING AND EXECUTING OPTION MEMORY FOR DEVICE IN SHADOW MEMORY OF A COMPUTER SYSTEM HAVING A BIOS

BACKGROUND

1. Field of the Invention

The invention relates generally to host bus adapters ("HBA") and more specifically relates to executing a decompressed portion of an option memory in a shadow memory.

2. Discussion of Related Art

A host bus adapter ("HBA") or a host adapter/controller is a device that connects to a host bus of a host computer for coupling the host computer to a peripheral device or link. Exemplary host bus standards include Peripheral Component Interconnect ("PCI"), Peripheral Component Interconnect Extended ("PCI-X"), and PCI Express. Many HBAs allow the host computer to connect to computer peripheral devices. For example, a PCI Redundant Array of Independent Disks ("RAID") HBA allows the host computer to connect to various storage devices through a PCI bus and the HBA.

An HBA can have an option memory that comprises instructions for allowing the host computer to initialize the HBA during system initialization, provide services of the HBA, and/or for allowing a user to configure the HBA. For example, the option memory of a RAID HBA may allow the host computer to initialize the HBA and locate storage devices, provide storage services including INT 13 functions, and/or allow a user to configure the HBA and the storage devices. The option memory (and/or the instructions it comprises) is often called "option ROM" that may be physically implemented in Read Only Memory ("ROM"), Flash memory of the HBA, or other suitable memories.

System initialization is often referred to as system basic input output system ("BIOS") power-on self-test ("POST"). During system initialization, a system BIOS program of the host computer loads the option memory, if any, from the HBA into a shadow memory area of system memory often called "shadow RAM." The option memory (or the instructions it comprises) in the shadow memory, now a "shadow" of the original, is then executed by the host computer. The option memory is limited in size. For example, the option memory of a PCI HBA has a practical limit of 64K bytes as many system BIOS programs impose such a limit on the size of the option memory for each HBA. This is because the size of the shadow memory is limited. If the host computer is unable to allocate enough shadow memory to load the option memory during system initialization, the option memory is not loaded, meaning that the HBA would not be initialized to provide service.

As HBAs are becoming more sophisticated to provide additional and better services, the size of the option memory is also growing. However, the size of the shadow memory is not growing, limiting the size of the option memory and the services that HBAs can provide. Again, these limitations are imposed by many system BIOS programs to assure compatibility with older legacy devices and programs.

Thus it is an ongoing challenge to execute the option memory in the shadow memory as the option memory continues to grow in size.

SUMMARY

The present invention solves the above and other problems, thereby advancing the state of the useful arts, by providing methods and devices for executing a decompressed portion of an option memory in a shadow memory. By decompressing a portion of the option memory using an allocated area of system memory, the decompressed portion can be stored and executed in the shadow memory. This technique allows the portion of the option memory to be compressed initially such that the size of the option memory including the compressed portion does not exceed certain size limits imposed by the BIOS program.

In one aspect hereof, a method is provided for executing an option memory of a computer peripheral interface device in conjunction with a system basic input output system ("BIOS") of a computer system having a shadow memory. The method comprises allocating an area of system memory and decompressing a portion of the option memory using the allocated area. The method also comprises storing the decompressed portion in the shadow memory. The option memory comprises uncompressed wrapper instructions adapted to perform the method.

Another aspect hereof provides a host bus adapter ("HBA") comprising an option memory. The option memory comprises instruction to be executed in conjunction with a system basic input/output system ("BIOS") of a computer system having a shadow memory. The option memory comprises instructions for allocating an area of system memory and instructions for decompressing a portion of the option memory using the allocated area. The option memory also comprises instructions for storing the decompressed portion in the shadow memory.

DETAILED DESCRIPTION OF THE DRAWINGS

Figure 1:
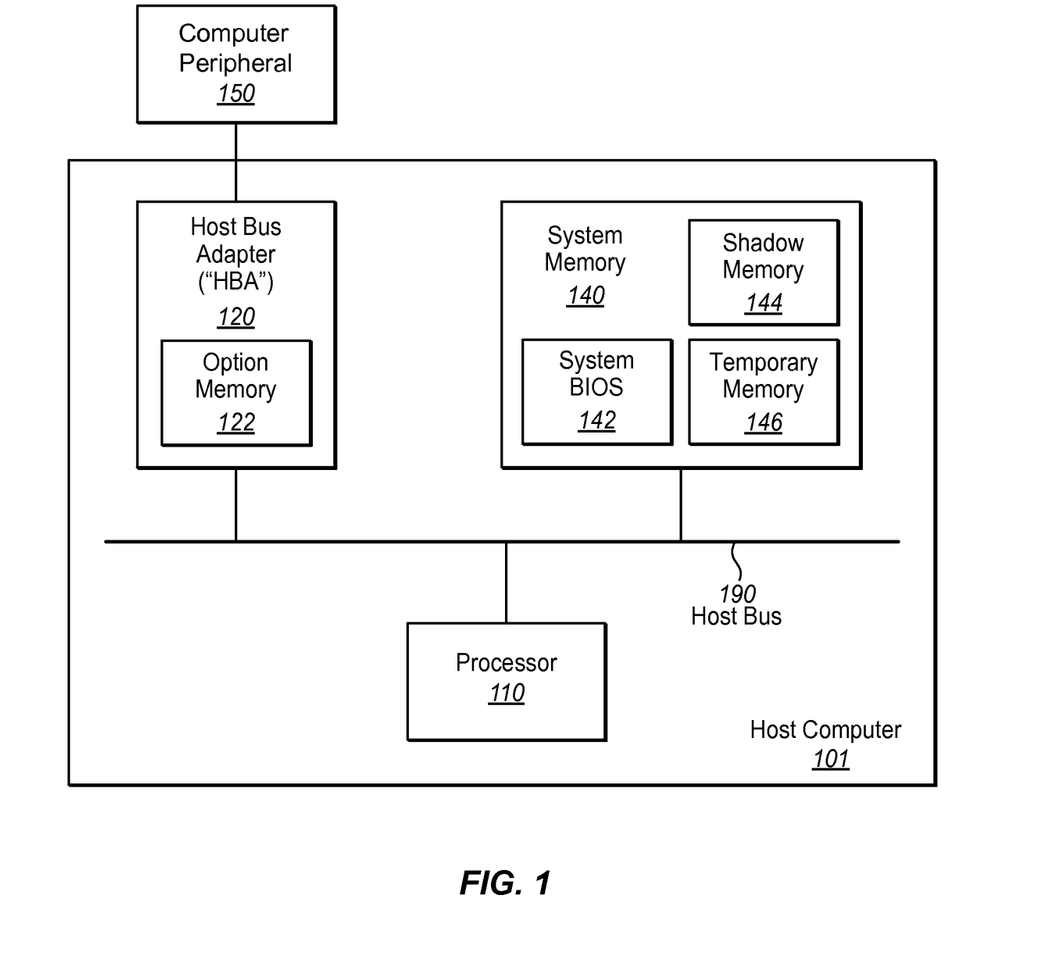
FIG. 1 is a block diagram of an exemplary host computer in accordance with features and aspects hereof.

FIG. 1 is a block diagram of an exemplary host computer in accordance with features and aspects hereof. The host computer 101 comprises a processor 110, a host bus adapter ("HBA") 120, and a system memory 140 that are linked through a host bus 190. As noted above, exemplary standards for the host bus 190 include PCI, PCI-X, and PCI Express. The HBA 120 comprises an option memory 122 and is coupled with a computer peripheral 150, allowing the host computer 101 to access the computer peripheral 150 via the host bus 190 and the HBA 120. The HBA 120 may also be referred to as a host adapter/controller. The computer peripheral 150 may be any peripheral device or link including, for example, a storage device such as a disk drive. The option memory 122 may be physically implemented in Read Only Memory ("ROM"), Flash memory of the HBA, or other suitable memories. The option memory 122 may comprise a runtime BIOS, a POST BIOS, and a configuration utility as will be described in greater detail.

The system memory 140 comprises system BIOS 142, shadow memory 144, and temporary memory 146. The system BIOS 142 in part refers to instructions that are executed when the host computer 101 is powered on. The instructions of the system BIOS 142 identify and initialize components of the host computer 101 including the HBA 120. Because the HBA 120 comprises the option memory 122, the instructions of the system BIOS 142 would attempt to allocate an area in the shadow memory 144 after identifying the HBA 120. If the area is allocated successfully, the instructions of the system BIOS 142 would copy the option memory 122 to the shadow memory 144 and cause instructions of the option memory 122 in the shadow memory 144 to begin execution. The temporary memory 146 can be used by the instructions of the system BIOS 142 or the option memory 122 as temporary storage of data and/or instructions.

Figure 2:
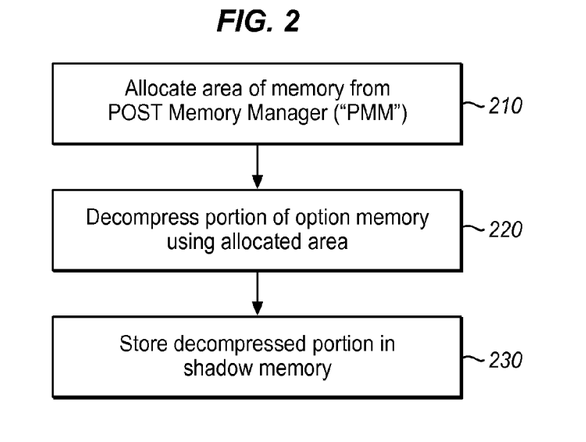
FIG. 2 is a flowchart describing an exemplary method in accordance with features and aspects hereof to store a decompressed portion of an option memory in a shadow memory.

FIG. 2 is a flowchart describing an exemplary method in accordance with features and aspects hereof to store a decompressed portion of an option memory in a shadow memory. For each HBA, the system BIOS copies the option memory to the shadow memory. The option memory includes wrapper instructions that are uncompressed and are adapted to perform the steps of FIG. 2. The wrapper instructions are located at the beginning of the option memory such that the wrapper instructions are executed when the system BIOS causes the option memory to begin execution. Execution begins at step 210, which allocates an area of system memory from a POST Memory Manager ("PMM"). The PMM is a component of the system BIOS that provides for the allocation of an area of memory during system POST. The area allocated from the PMM may be considered a part of the temporary memory for temporary storage of data and/or instructions. Step 220 decompresses a portion of the option memory using the allocated area. At step 230, the wrapper instructions store the decompressed portion in the shadow memory so that instructions of the decompressed portion can be executed in the shadow memory.

Figure 3:
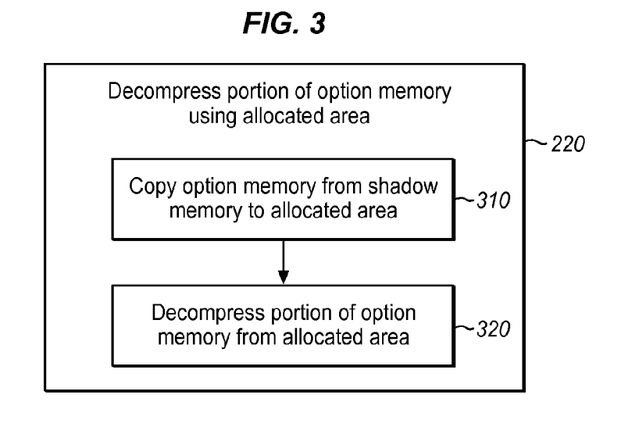
FIG. 3 is a flowchart describing exemplary additional details to decompress a portion of an option memory using an allocated area of system memory.
Figure 6:
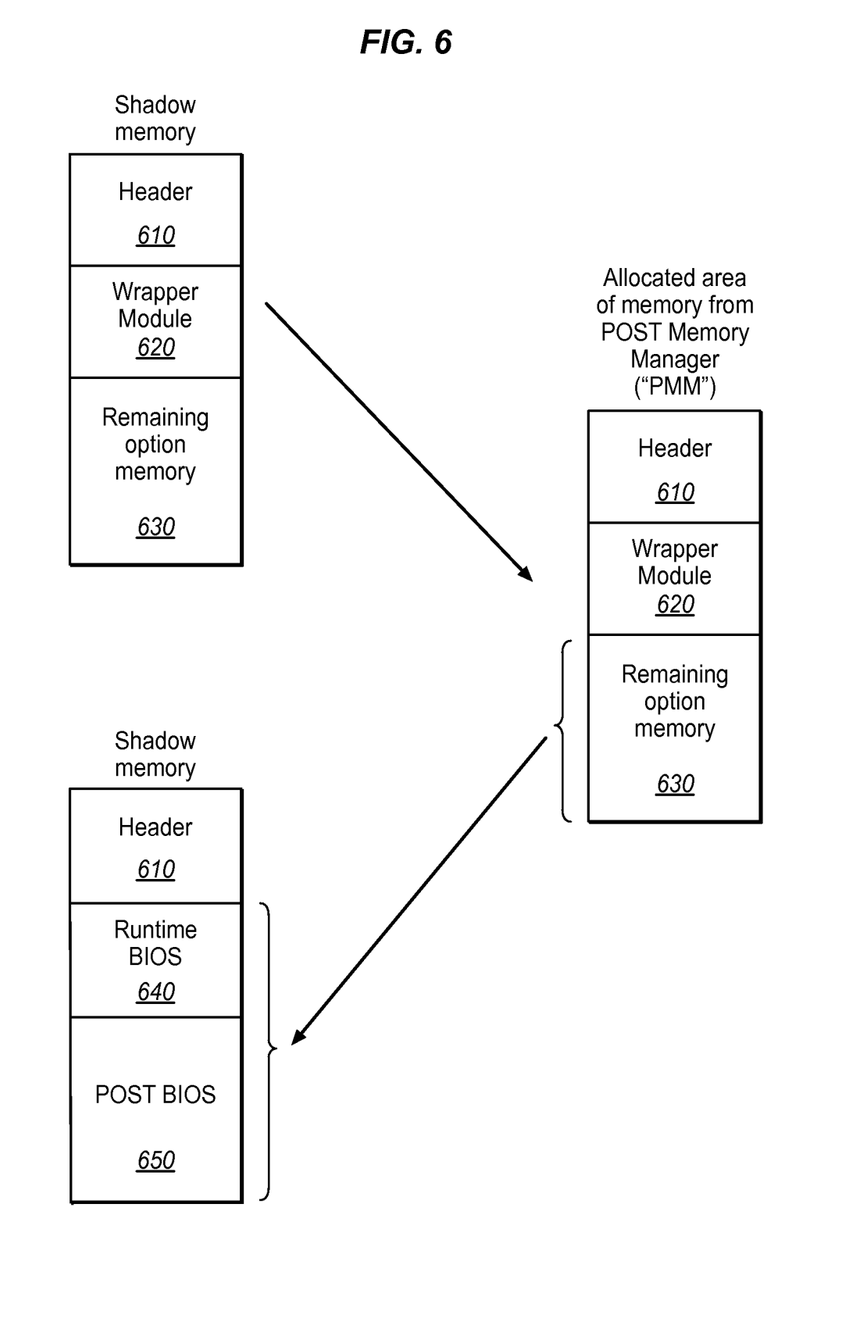
FIG. 6 illustrates operation of an exemplary method for decompressing a portion of an option memory using an allocated area of system memory.

FIG. 3 is a flowchart describing exemplary additional details of step 220 of FIG. 2 to decompress a portion of an option memory using an allocated area of system memory. Step 310 copies the option memory from the shadow memory to the allocated area (allocated from the PMM). Step 320 decompresses the portion of the option memory from the allocated area. Details of this method are illustrated in FIG. 6.

Figure 4:
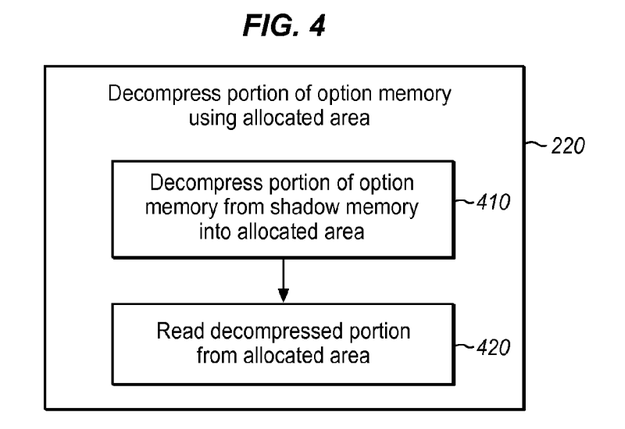
FIG. 4 is a flowchart describing alternative exemplary details to decompress a portion of an option memory using an allocated area of system memory.
Figure 7:
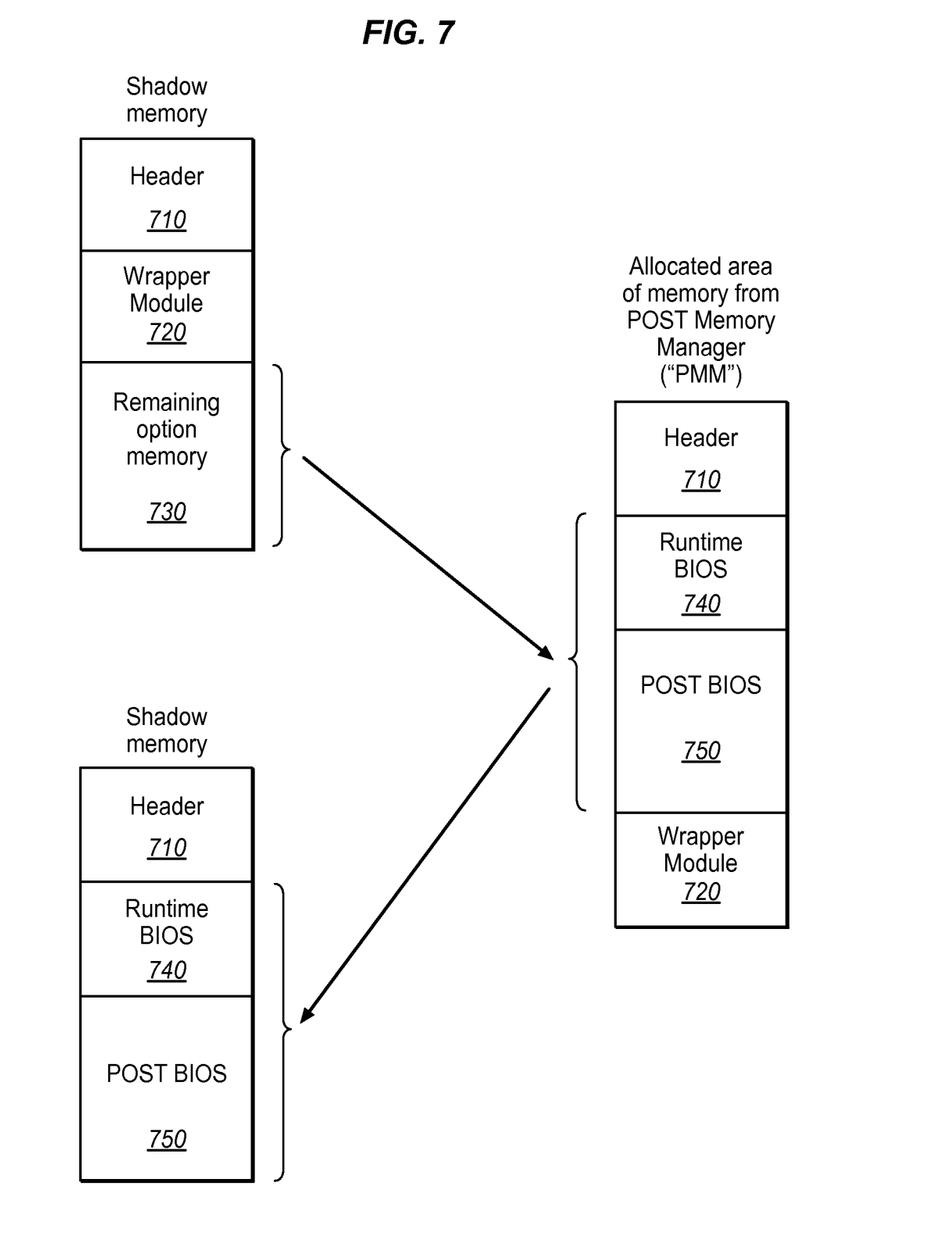
FIG. 7 illustrates operation of another exemplary method for decompressing a portion of an option memory using an allocated area of system memory.

FIG. 4 is a flowchart describing alternative exemplary details of step 220 of FIG. 2 to decompress a portion of an option memory using an allocated area of system memory. Step 410 decompresses the portion of the option memory from shadow memory into the allocated area. Step 420 reads the decompressed portion from the allocated area. Details of this method are illustrated in FIG. 7.

Figure 5:
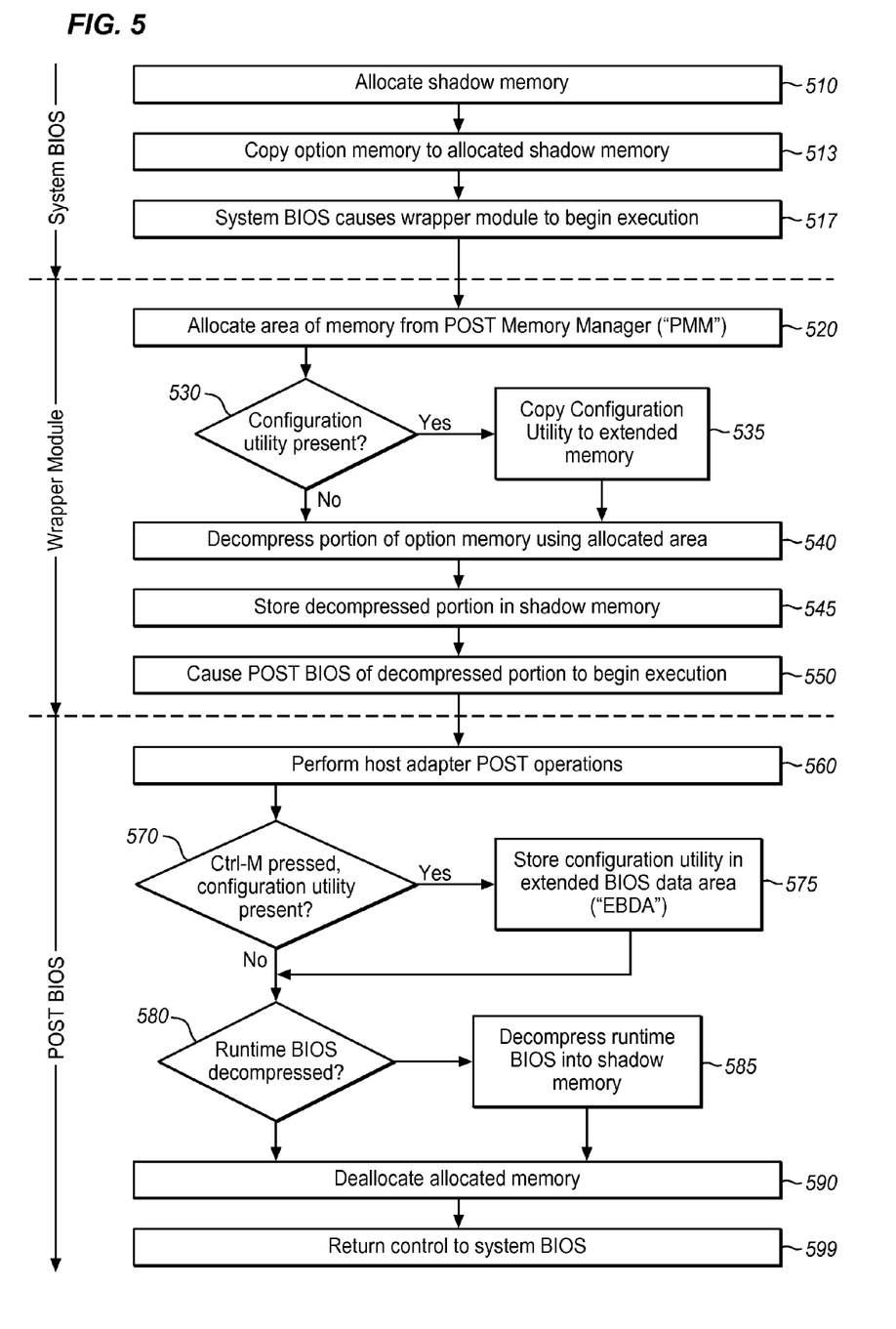
FIG. 5 is a flowchart describing an exemplary method in accordance with features and aspects hereof to execute a decompressed portion of an option memory.

FIG. 5 is a flowchart describing an exemplary method in accordance with features and aspects hereof to execute a decompressed portion of an option memory. After having identified the HBA and that the HBA comprises option memory, the system BIOS allocates an area in the shadow memory at step 510. At step 513, the system BIOS copies the option memory from the HBA to the allocated area in the shadow memory. At step 517, the system BIOS causes the option memory, more specifically a wrapper module of the option memory, to begin execution.

At step 520, the wrapper module allocates an area of memory from the PMM. The wrapper module then determines whether a configuration utility is present at step 530. The configuration utility is often referred to as a setup program or a control-M image that is invoked by a user to configure/set up the HBA. For example, in the case of a RAID HBA, the configuration utility may be invoked to configure a RAID storage system supported by the HBA. If the configuration utility is present, the wrapper module copies or decompresses the configuration utility into extended memory at step 535. It will be understood that the extended memory area in many host computers typically starts at memory address 1 MB and extends to 4 GB. The extended memory is accessible during POST when the system BIOS puts the processor in Big Real Model ("BRM") to avoid the overhead of protected mode. If the configuration utility is not present, the wrapper module proceeds to the next step 540.

As noted above, the option memory may comprise a runtime BIOS, a POST BIOS, and a configuration utility. At step 540, the wrapper module decompresses a portion of the option memory using the area of memory allocated from the PMM. The portion of the option memory may comprise a compressed runtime BIOS and a compressed POST BIOS. Details of the step 540 have been described in FIGS. 3 and 4 and are also illustrated further below. At step 545, the wrapper module stores the decompressed portion in the shadow memory. Accordingly, the decompressed portion in the shadow memory may comprise a decompressed runtime BIOS and a decompressed POST BIOS. At step 550, the wrapper module causes the decompressed POST BIOS to begin execution.

At step 560, the POST BIOS begins to perform POST operations for the HBA. For example, the POST BIOS may initiate the HBA and locate storage devices that are coupled with the HBA. At step 570, the POST BIOS determines whether control-M or another hot key has been pressed by a user wishing to invoke the configuration utility and determines whether the configuration utility is present. If so, the POST BIOS stores the configuration utility in memory of an extended BIOS data area ("EBDA") at step 575.

Figure 8:
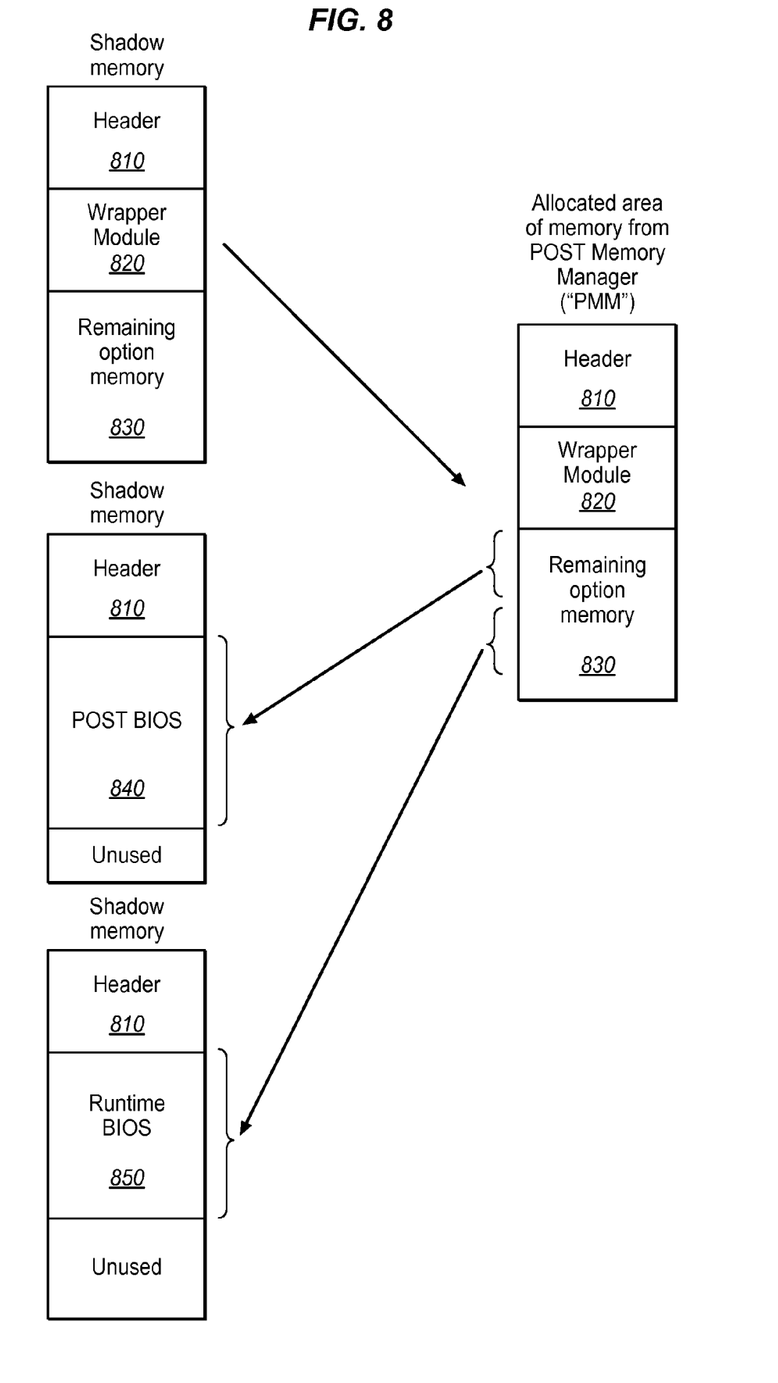
FIG. 8 illustrates operation of yet another exemplary method for decompressing a portion of an option memory using an allocated area of system memory.

At step 580, the POST BIOS may determine if a runtime BIOS has been decompressed. If not, the POST BIOS decompresses the runtime BIOS into the shadow memory at step 585. The POST BIOS may alternatively cause the wrapper module to begin execution so the POST BIOS may be overwritten after POST operations have been completed. In this alternative, the wrapper module would perform the step 585. Details of this and related steps are illustrated in FIG. 8. At step 590, any memory that is allocated from the PMM as temporary storage may then be deallocated. However, it will be understood that if the steps of 580 and 585 are not performed, the step 590 may be performed prior to the step 570. At step 599, control is returned to the system BIOS, which may repeat the steps starting from step 510 for another HBA.

Those of ordinary skill in the art will readily recognize numerous additional and equivalent steps that may be performed in the methods of FIGS. 2 through 5. Such additional and equivalent steps are omitted herein merely for brevity and simplicity of this discussion.

Exemplary resulting operations of the exemplary methods of FIGS. 2-5 are illustrated in FIGS. 6-11. In FIGS. 6-11, blocks of memory are shown that relate to the option memory. A particular block of memory may be shown multiple times to show the content of the particular block of memory over time. Arrows in the figures generally show movement of data as the data is copied or decompressed.

FIG. 6 illustrates operation of an exemplary method for decompressing a portion of an option memory using an allocated area of system memory. The system BIOS has copied the option memory from the HBA to the shadow memory. The option memory comprises a header 610, a wrapper module 620, and remaining option memory 630. The header 610 indicates a size of the option memory, and the wrapper module 620 comprises uncompressed wrapper instructions adapted to perform steps of FIG. 3. The wrapper instructions first allocate an area of system memory from the PMM and copy the option memory from the shadow memory to the allocated area. The whole option memory comprising the header 610, the wrapper module 620, and the remaining option memory 630 may be copied. However, certain portions of the option memory may be copied instead, for example, without the header 610.

The wrapper instructions may decompress a portion of the remaining option memory 630 into the shadow memory without overwriting the wrapper module 620 being executed in the shadow memory. Alternatively, the wrapper module 620 being executed in the shadow memory may cause the wrapper module 620 in the allocated area to begin execution. This alternative allows the wrapper module 620 in the shadow memory to be overwritten. The portion of the remaining option memory 630 may be decompressed into a runtime BIOS 640 and a POST BIOS 650 in the shadow memory. Another portion of the remaining option memory 630 may be copied or decompressed into another area of the system memory as will be discussed in greater detail with respect to a configuration utility. Finally, the wrapper module 620 causes the instructions of the POST BIOS 650 to begin execution.

FIG. 7 illustrates operation of another exemplary method for decompressing a portion of an option memory using an allocated area of system memory. The system BIOS has also copied the option memory from the HBA to the shadow memory. The option memory comprises a header 710, a wrapper module 720, and remaining option memory 730. The header 710 indicates a size of the option memory, and the wrapper module 720 comprises uncompressed wrapper instructions adapted to perform steps of FIG. 4. The wrapper instructions first allocate an area of system memory from the PMM and decompress a portion of the remaining option memory 730 into the allocated area. The portion of the remaining option memory 730 may be decompressed into a runtime BIOS 740 and a POST BIOS 750 in the allocated area. Another portion of the remaining option memory 730 may be copied or decompressed into another area of system memory as will be discussed in greater detail with respect to a configuration utility. The allocate area may also comprise the header 710.

The wrapper instructions then read the runtime BIOS 740 and the POST BIOS 750 in the allocated area to be stored in the shadow memory without overwriting the wrapper module 720. Alternatively, the wrapper module 720 being executed in the shadow memory may copy the wrapper module 720 (or a portion) to the allocated area and cause the copied (portion of) wrapper module 720 in the allocated area to begin execution. This alternative allows the wrapper module 720 in the shadow memory to be overwritten. Finally, the wrapper module 720 causes the instructions of the POST BIOS 750 to begin execution.

FIG. 8 illustrates operation of yet another exemplary method for decompressing a portion of an option memory using an allocated area of system memory. The system BIOS has copied the option memory from the HBA to the shadow memory as well. The option memory comprises a header 810, a wrapper module 820, and remaining option memory 830. The wrapper module 820 comprises uncompressed wrapper instructions adapted to perform steps of FIG. 5 including steps 580 and 585. The wrapper instructions first allocate an area of system memory from the PMM and copy the option memory from the shadow memory to the allocated area. The whole option memory comprising the header 810, the wrapper module 820, and the remaining option memory 830 may be copied. However, certain portions of the option memory may be copied instead, for example, without the header 810.

The wrapper instructions may decompress a portion of the remaining option memory 830 into the shadow memory without overwriting the wrapper module 820 being executed in the shadow memory. Alternatively, the wrapper module 820 in the shadow memory may be overwritten similar to FIG. 6. The portion of the remaining option memory 830 that is decompressed may comprise the POST BIOS 840 without the runtime BIOS 850. If this were the case, it will be understood that the POST BIOS 840 would have been built to not depend on the runtime BIOS 850. The wrapper instructions then cause the POST BIOS 840 to begin execution. After the POST BIOS 840 has completed POST operations, the POST BIOS 840 may cause the wrapper module 820 to begin operation again so that the POST BIOS may then be overwritten when the runtime BIOS 850 is decompressed into the shadow memory.

Figure 9:
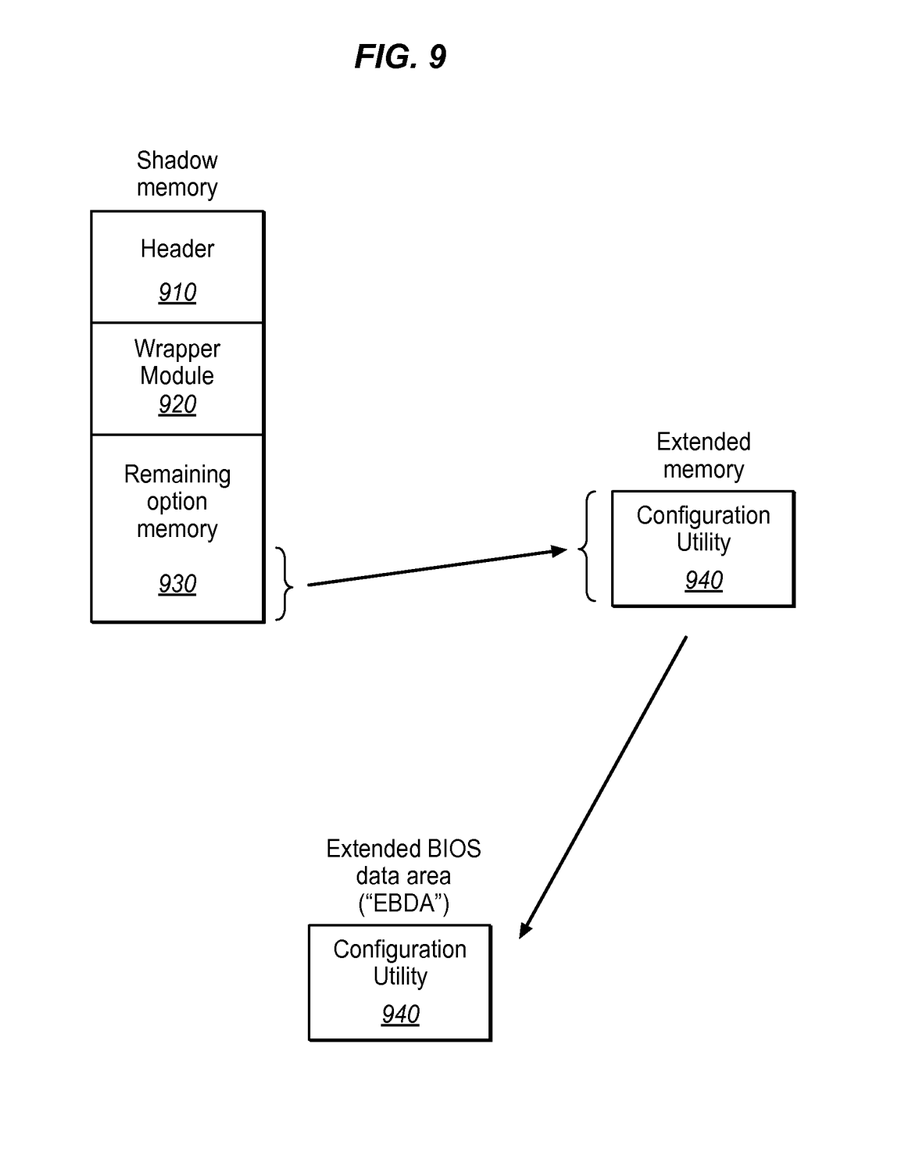
FIG. 9 illustrates operation of an exemplary method for storing a configuration utility in memory of an extended BIOS data area ("EBDA").

FIG. 9 illustrates operation of an exemplary method for storing a configuration utility in EBDA. The system BIOS has copied the option memory from the HBA to the shadow memory. The option memory comprises a header 910, a wrapper module 920, and remaining option memory 930. A portion of the remaining option memory 930 may be copied or decompressed from the shadow memory into extended memory. The portion comprises a configuration utility 940. It is noted that areas of the extended memory may be allocated from the PMM. For example, three 64K segments from below 1 MB (to allow for 20 bit segmented memory addressing, e.g., by the configuration utility 940) may be allocated from the PMM. The configuration utility 940 may be decompressed or loaded into a destination segment, and the two remaining segments may be used for scratch and as read/write buffer. Additionally, if the areas of the extended memory cannot be allocated from the PMM (e.g., the requested memory is not available), following POST the option memory will hook (intercept) INT 19 and decompress or load the configuration utility 940 into a fixed address, for example, at address 5000:0. Other fixed address may be used for scratch (e.g., at address 6000:0) and as read/write buffer (e.g., at address 7000:0).

Because the extended memory may become corrupted and/or used for another purpose by the time the configuration utility 940 needs to be launched following POST, the configuration utility 940 is then copied to EBDA if a user wishes to invoke the configuration utility. Alternatively, the option memory may be able to launch the configuration utility 940 right away without waiting for POST to complete.

Figure 10:
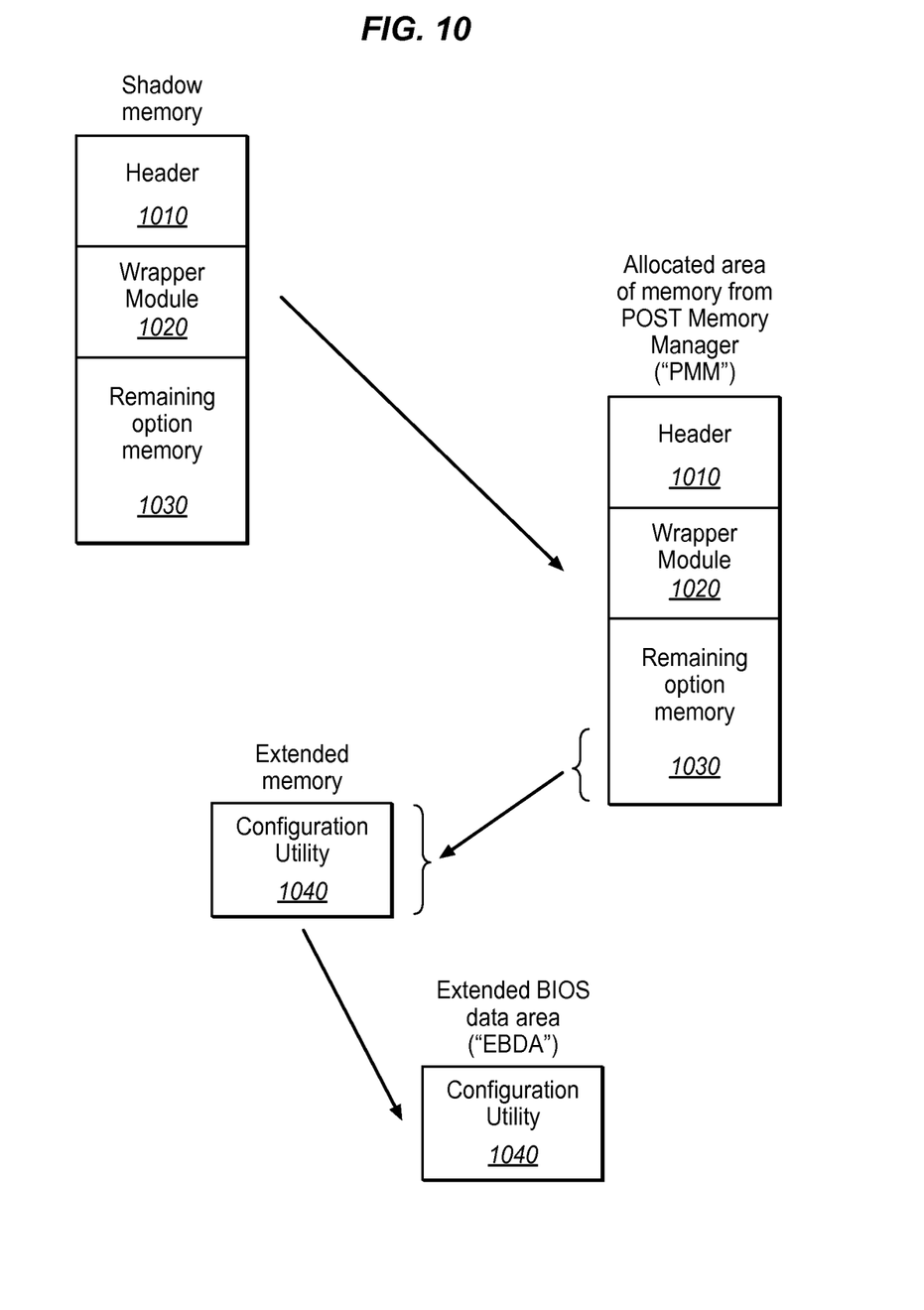
FIG. 10 illustrates operation of another exemplary method for storing a configuration utility in EBDA.

FIG. 10 illustrates operation of another exemplary method for storing a configuration utility in EBDA. The system BIOS has copied the option memory from the HBA to the shadow memory. The option memory comprises a header 1010, a wrapper module 1020, and remaining option memory 1030. The option memory is first copied to an allocated area of system memory (allocated from the PMM); then a portion of the remaining option memory 1030 may be copied or decompressed from the allocated area into extended memory. The portion comprises a configuration utility 1040, which is then copied to EBDA if a user wishes to invoke the configuration utility.

Figure 11:
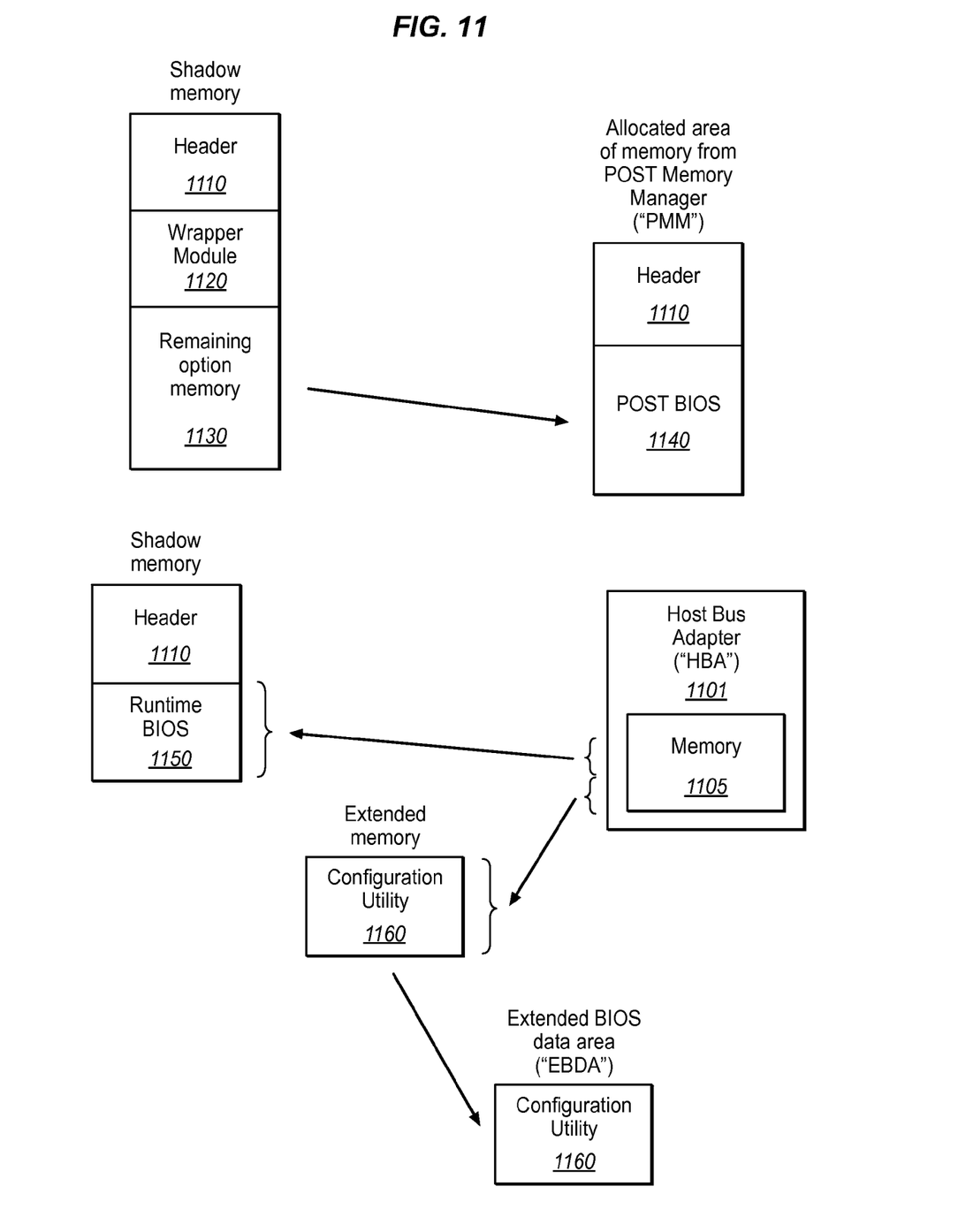
FIG. 11 illustrates operation of yet another exemplary method for storing a configuration utility in EBDA.

FIG. 11 illustrates operation of yet another exemplary method for storing a configuration utility in EBDA. The system BIOS has copied the option memory from an HBA 1101 to the shadow memory. The option memory comprises a header 1110, a wrapper module 1120, and remaining option memory 1130. The wrapper module 1120 decompresses the remaining option memory 1130 into an allocated area of system memory as POST BIOS 1140. The wrapper module 1120 then causes the POST BIOS 1140 to begin execution. As part of the POST operations by the POST BIOS 1140, the POST BIOS 1140 copies or decompresses a runtime BIOS 1150 directly from a memory 1105 of the HBA 1101 into the shadow memory, and copies or decompresses a configuration utility 1160 directly from the memory 1105 into extended memory. The configuration utility 1160 is then copied to EBDA if a user wishes to invoke the configuration utility.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for executing an option memory of a computer peripheral interface device in conjunction with a system basic input output system ("BIOS") of a computer system having a shadow memory and a host bus adapter ("HBA"), the method comprising:
   allocating an area of system memory during Power On Self Test ("POST") for the system;
   decompressing, via the BIOS, a portion of the option memory using the allocated area during POST for the system; and
   storing, via the BIOS, the decompressed portion in the shadow memory during POST for the system;
   wherein the option memory comprises uncompressed wrapper instructions adapted to perform the method.

2. The method of claim 1, wherein
   the peripheral interface device comprises a Host Bus Adapter (HBA) compliant with at least one of Peripheral Component Interconnect Express (PCI-E) and Peripheral Component Interconnect (PCI), and
   the option memory resides at the PCI-E HBA.

3. The method of claim 1, wherein the step of allocating comprises allocating the allocated area from POST Memory Manager ("PMM").

4. The method of claim 1, wherein the portion of the option memory comprises a runtime BIOS and a power-on self-test ("POST") BIOS.

5. The method of claim 4, further comprising:
   causing the POST BIOS to begin execution.

6. The method of claim 1, wherein the portion of the option memory comprises a POST BIOS and a runtime BIOS, the method further comprising:
   causing the POST BIOS to begin execution; and
   decompressing, after the POST BIOS begins execution, the runtime BIOS into the shadow memory.

7. The method of claim 1, further comprising:
   copying a configuration utility in the option memory into extended memory.

8. The method of claim 7, further comprising:
   storing, in response to receiving a user input, the configuration utility in memory of an extended BIOS data area ("EBDA").

9. The method of claim 8, wherein the step of copying the configuration utility is performed by a POST BIOS.

10. The method of claim 1, wherein the step of decompressing comprises:
    decompressing the portion of the option memory from the shadow memory into the allocated area; and
    reading the decompressed portion from the allocated area.

11. A host bus adapter ("HBA") comprising:
    an option memory comprising instruction to be executed in conjunction with a system basic input/output system ("BIOS") of a computer system having a shadow memory, and wherein the option memory comprises:
    instructions for allocating an area of system memory during Power On Self Test f"POST") for the system;
    instructions for decompressing, via the BIOS, a portion of the option memory using the allocated area during POST for the system; and
    instructions for storing, via the BIOS, the decompressed portion in the shadow memory during POST for the system.

12. The HBA of claim 11, wherein the instructions for decompressing comprise:
    instructions for copying the option memory from the shadow memory to the allocated area; and
    instructions for decompressing the portion of the option memory from the allocated area.

13. The HBA of claim 11, wherein the instructions for allocating comprises instructions for allocating the allocated area from POST Memory Manager ("PMM").

14. The HBA of claim 11, wherein the portion of the option memory comprises a runtime BIOS and a power-on self test ("POST") BIOS.

15. The HBA of claim 14, wherein the option memory further comprises:
    instructions for causing the POST BIOS to begin execution.

16. The HBA of claim 11, wherein the portion of the option memory comprises a POST BIOS and a runtime BIOS, and wherein the option memory further comprises:
    instructions for causing the POST BIOS to begin execution; and
    instructions for decompressing, after the POST BIOS begins execution, the runtime BIOS into the shadow memory.

17. The HBA of claim 11, wherein the option memory further comprises:
    instructions for copying a configuration utility in the option memory into extended memory.

18. The HBA of claim 17, wherein the option memory further comprises:
    instructions for storing, in response to receiving a user input, the configuration utility in memory of an extended BIOS data area ("EBDA").

19. The HBA of claim 18, further comprising a POST BIOS that comprises the instructions for copying the configuration utility.

20. The HBA of claim 11, wherein the instructions for decompressing comprises:
- instructions for decompressing the portion of the option memory from the shadow memory into the allocated area; and
- instructions for reading the decompress portion from the allocated area.

* * * * *